United States Patent [19]
Curtis

[11] Patent Number: 5,162,094
[45] Date of Patent: Nov. 10, 1992

[54] FUSION POWER GENERATING SYSTEM

[76] Inventor: Daniel L. Curtis, 1956 Ardmore Ave., Manhattan Beach, Calif. 90266

[21] Appl. No.: 695,551

[22] Filed: May 3, 1991

[51] Int. Cl.$^5$ .............................................. G21C 1/02
[52] U.S. Cl. ..................... 376/107; 376/146
[58] Field of Search ................ 376/107, 146, 100

[56] References Cited

U.S. PATENT DOCUMENTS

| | | | |
|---|---|---|---|
| 3,155,592 | 11/1964 | Hansen et al. | 376/107 |
| 4,172,008 | 10/1979 | Fleet | 376/107 |
| 4,202,725 | 5/1980 | Jarnagin | 376/107 |
| 4,650,630 | 3/1987 | Boyer | 376/107 |
| 4,826,646 | 5/1989 | Bussard | 376/107 |

Primary Examiner—Daniel D. Wasil

[57] ABSTRACT

An approach (10) is provided as a way of obtaining useful power from a fusion reaction utilizing light weight isotopes of hydrogen and helium. A potential well is created between two accelerating electrodes (26) that, in a vacuum, allows ions from sources (24) to be captured by the potential well. An axial magnetic field as created by solenoid (20) causes the captured ions to pass through an ion focusing region (22) and thus allowing fusion reactions to take place within the region. The magnetic field also confines the trajectory of the fusion products (18) to a series of helixes preventing them from reaching the solenoid walls, but instead forces them to exit the two ends of the solenoid. Useful power is obtained by allowing two heat exchangers to intercept the fusion ions and thereby allowing a coolant liquid to be heated as would be required to operate a steam turbogenerator. In a second embodiment the solenoid is shaped in a U configuration allowing the fusion products to exit the solenoid in essentially the same direction and thus derive useful thrust as would be required for spacecraft propulsion.

7 Claims, 3 Drawing Sheets

FUSION POWER GENERATING SYSTEM

BACKGROUND OF INVENTION

The present invention relates to an apparatus and method of achieving a fusion propulsion engine as could be used by a starship that is both highly efficient and is capable of achieving very high fuel specific impulse. The invention also relates to the use of said basic engine as a generator for supplying very large amount of power in the form of heat that can then be converted to electrical energy by use of conventional steam turbo-generators.

The search for controlled fusion has been a major scientific effort for many years. The major thrust has been directed at the brute force approach of heating a gaseous mixture (usually deuterium and tritium) in the form of a plasma (ionized gas) to sufficient temperature and pressure and then holding this state for sufficient time to allow the nuclei of the mixture to collide and thus fuse with the liberation of energy. Despite the expenditures of vast sums of money and effort, this approach has yet to achieve a "breakeven" condition as defined by the point at which the amount of energy being produced is equal to the amount of input energy. The "breakeven" condition, assuming it can eventually be achieved by the plasma "ohmic heating approach" would represent only about 1% of the available fusion energy being realized and with 99% being lost.

The major difficulty with the plasma heating approach has been that the only way to contain the plasma during the heating phase is with magnetic fields. The plasma has, so far, always been able to exhibit some form of instability that has prevented the magnetic fields from being able to contain the heated, ionized gas for sufficient time to even reach the breakeven point in energy production. The present prediction is that it will be at least 40 years before this approach can be expected to produce useful energy. The production of useful energy is estimated to require a fusion energy output at least 10 times the breakeven point. It may also be true that this approach will never work in terms of producing useful energy from a fusion process.

In the late '60s another approach was given serious consideration in an attempt to solve the controlled fusion problem. This approach involved the creation of a potential well through which ionized particles (again notably deuterium and tritium, the D-T reaction) were made to osillate at high relative energies and thus occasionally experience a head-on collision that resulted in fusion. The best example of this approach is contained in a paper by Dr. R. L. Hirsch (Inertial-Electrostatic Confinement of Ionized Fusion Gases, J. Appl. Phys. 38, No. 11, 4522-4534, 1967) in which it was reported that significant neutrons (the product of a D-T fusion reaction) were detected from the apparatus as described in the article. It is believed that the approach was abandoned, however, as it did not appear that it could lead to the generation of useful amounts of energy. Its major problem was that the maximum relative ion energy occurring at the center of the potential well was also the point of minimum density. The low density at the well's center prevented appreciable fusion reactions from occurring.

SUMMARY OF THE INVENTION

The present invention is a form of the potential well approach to fusion. In this approach gaseous, positive ionized molecules are injected into a potential well (in a vacuum) as formed by an electrostatically negative, ring electrode that is constructed to first accelerate the ions through a potential as determined by the magnitude of voltage of the negative electrode and then decelerate them as they attempt to leave the vicinity of the electrode. The ions are thus captured in the potential well and will repeatedly oscillate through the well as the ion energy is continually exchanged between kinetic and potential. This is basically the approach as described in the Hirsch paper as previously cited.

A departure from previous efforts is accomplished in the present invention by allowing the potential well to exist in a uniform magnetic field and by the further innovation of using two accelerating ring electrodes of the same negative potential and thus create a constant potential drift region in the magnetic field between the two rings. After an initial ion acceleration to high velocity by the first electrode, the ions are caused to move across the drift region at essentially constant high velocity until they reach the second electrode. After passing through the second electrode they will then experience a deceleration force until finally reversing their direction and with the second electrode accelerating them again though the potential well. In this manner the ions are made to repeatedly oscillate though the drift region, potential well of the device as they are caused to move between the two electrodes.

In addition, the action of the uniform magnetic field acting on the ions though their entire flight causes the individual paths to be brought to a focus within the drift region that can be designed to be the region's midpoint. After passing through the magnetic convergent point in the drift region, the ions diverge before reaching the second electrode and are then decelerated to be refocused to a virtual anode before reversing direction to repeat the oscillating process. The ions at the drift region focus point are thus in a concentrated form and possess high energies. As new ions can be continually added to the potential well from the ion source (or sources) the ion concentration at the convergent point can continually be made to increase. In addition, on the average, the convergent point will always contain equal numbers of ions moving in opposite directions. If the ions being used are the two heavy isotopes of hydrogen, deuterium and tritium, and the accelerating potential for the ions is in the range of 100 Kev, then head-on collisions will result in fusion occurring.

Collisions between deuterium and tritium can be used by the application of this invention to achieve a fusion condition and thus the creation of very high energy fusion byproducts. The equation for this reaction can be expressed as $_1D^2 + _1T^3 \rightarrow _2He^4 + _0n^1 + 17.6$ Mev where the subscripts denote the number of protons while the superscripts provide the number of both protons and neutrons and thus the atomic mass. The D-T fusion reaction is the most easily accomplished as only a single proton exists in the nuclei of the two input gases, D and T, that presents an electrostatic barrier needing to be overcome by the relative energy of the two colliding nuclei. As shown by the equation, the neutron and helium byproducts of the reaction share in the resultant fusion energy of 17.6 Mev in proportion to their mass with approximately 1/5 the total energy being contained by the kinetic energy of the neutron.

While the D-T fusion reaction requires the least amount of input energy to overcome the repulsive potential barrier caused by the two protons in the nuclei, a problem exists in that an appreciable amount of the resultant fusion energy released is contained by the kinetic energy imparted to the neutron that is not ionized and thus its flight path cannot be controlled by either electrostatic or magnetic fields. For some fusion applications, such as a fusion propulsion engine for a spacecraft, it is very desirable that all resultant fusion particles can be controlled to prevent them from impacting spacecraft structure. Impacts would cause the kinetic energy of the collision particle to be transformed into heat that would have to be rejected by the vehicle to prevent it from being vaporized by its own waste heat, assuming even a modest size propulsion unit. Calculations show that if a D-T fusion reaction is used for spacecraft propulsion, the neutron from the reaction will cause insurmountable waste heat problems for engines that have in excess of about 1000 pounds thrust.

A more favorable fusion reaction for use in a spacecraft that could also be employed by the present invention is the deuterium-helium$^3$ reaction ($_1D^2 + _2He^3 \rightarrow _2He^4 + _1H^1 + 18.3$ Mev). As both fusion byproducts ($_2He^4$ and $_1H^1$) are ionized, their paths can be controlled by a sufficiently strong magnetic field to prevent the particles from contacting spacecraft structure including the electrical conducting coils (that could be superconductors) as used to generate the magnetic field. It can be shown that if a magnetic field in the range of 10,000 gauss is generated by a 14 foot minimum diameter solenoid, fusion particles from a D-he$^3$ reaction generated along the major axis of the solenoid will be forced by the magnetic field into spirals having diameters less than the radius of the solenoid and thus prevented from reaching the solenoid structure. The particles instead will spiral to the two ends of the solenoid and then leave the magnetic field as its field strength diminishes to a point insufficient to further contain the particles.

In addition, by altering the form of the solenoid from a simple cylinder to a U-shaped configuration, the ionized, high energy particles can be made to exit the magnetic field from the ends in essentially the same direction and thus impart a net momentum transfer of thrust to the spacecraft by virtual of the solenoid's magnetic field forcing the particles to experience a 90° change in direction. By use of the D-He$^3$ fusion reaction, all resultant fusion particles can be deflected by the magnetic field and can thus result in useful thrust in addition to avoiding waste heat collisions with the spacecraft structure.

The D-He$^3$ reaction has, however, two problems that need to be addressed. First, the light isotope of helium, He$^3$, does not exist in nature and thus must be manufactured. One method for accomplishing this goal is to create a supply of tritium by bombarding the relative abundant light lithium isotope, Li$^6$, with neutrons:

$$_0n^1 + _3Li^6 \rightarrow _2He^4 + _1T^3$$

The tritium so produced can then be stored allowing radioactive decay to proceed with a half life of 12.3 years and thus generate the desired light helium isotope:

$$_1T^3 \rightarrow _2He^3 + beta$$

A second method that will result in the direct production of helium$^3$ is to use the present invention to cause deuterium ions to collide in a fusion reaction by use of the present invention:

$$_1D^2 + _1D^2 \rightarrow _2He^3 + _0n^1$$

Of equal probability, however, when two deuterium nuclei collide is the fusion reaction:

$$_1D^2 + _1D^2 \rightarrow _1T^3 + _1H^1$$

The tritium so produced can be stored to generate an additional amount of helium$^3$ by allowing radioactive decay to proceed as with the neutron-lithium$^6$ reaction.

A second problem with the D-He$^3$ reaction is that more initial energy is required to overcome the nuclei potential barrier than for the D-T reaction. The optimum input energy allowing two nuclei to fuse for the D-T reaction is about 100 Kev and therefore giving a relative energy of 200 Kev during head-on collisions. Because the helium nucleus has two protons, it can be shown that the optimum input energy for fusion of the input particles must be doubled to about 200 Kev and thereby achieving a relative energy of 400 Kev during head-on fusion collisions. However, as the resultant energy from the D-He$^3$ reaction is 18.3 Mev as compared to 17.6 Mev for the D-T reaction, the net gain in energy favors the deuterium-helium$^3$ reaction.

Achieving sustained fusion conditions allowing essentially 100% utilization of fuel with either the D-T or D-He$^3$ reaction at the magnetic convergent point in the drift region of the present invention will require a high density of ions in addition to high relative energy between particles. As the geometry of the magnetic focus, fusion region of the present invention is a mirror image of the ion source geometry, it is, of course, important that the ion source geometry have as small dimensions as possible to produce the highest concentration of input nuclei at the magnetic convergent point. One method of achieving this goal is to use a modification of an invention by the American inventor, Nicola Tesla (U.S. Pat. No. 493,776, Incandescent Electric Light, 1892). In this invention Tesla showed how a small button of refractory material such as diamond could be heated to incandescent temperatures by allowing the material to be bombarded by ions as caused by the application of a high voltage, high frequency excitation to the refractory material.

One embodiment of the present invention makes use of Tesla's Incandescent Electric Light by adding a few thousands of an inch diameter hole through the refractory material button. The added hole allows the passage of the input gases as required for the fusion reaction. As the gases are passing though the hole in the center of the button, they are heated to a high temperature that can be in the range of 5,000° F. as they make contact with the inner walls of the refractory material (diamond, for example). Upon leaving the hole exit, the already thermally excited molecules of gas are then totally ionized by the high intensity, RF field in combination with the concentrated ion bombardment created by the RF field. The net result is a highly concentrated ion source insuring that the ion concentration at the magnetic focused point of the present invention will be sufficient for a high probability of fusion reactions occurring.

With either the D-T or the D-He$^3$ fusion reaction two problems are encountered in using the potential well approach that need to be addressed. The first is the mutual repulsion force acting between the positively charged ions trapped in the potential well. This force will act to defocus the particles as they are made to magnetically converge within the drift region of the device. As the amount of defocusing as caused by the mutual repulsion force is proportional to the number of ions present, adding ions to the potential well in order to increase the density at the convergent point will tend to be nullified by the increased repulsive force. Offsetting this effect, however, is the fact that free electrons will always be present in the ion stream that will act to shield the individual ions from each other. Electron shielding will therefore permit high nuclei density in the oscillating beams at their convergent points.

A second potential cause of defocusing of the ion beam at the convergent points is the problem of ion scattering as caused by near misses of two approaching nuclei. Most ions, in fact, will experience many scattering collisions before encountering a fusion collision. After a scattering collision the near miss of the two ions can cause an alteration of trajectories approaching 90° and without corrective action there would be little hope of achieving an appreciable number of fusion reactions at the magnetic focus region as the particles would be scattered before a fusion reaction could occur. The corrective action is achieved by the fact that the initial ion scattering occurs in a magnetic field that controls the flight of the two particles after scattering happens. The magnetic field forces the nuclei to return to the exact spot where the initial scattering occurred during the next oscillation of the particles through the potential well of the apparatus. The ion density at the magnetic focus region is thereby allowed to increase as new ions are added to the well despite scattering.

An ion trajectory moving exactly perpendicular to the axial magnetic field of the encompassing solenoid after scattering (the 90° scattering angle) will always cause the trajectory to be a circle and in one revolution the ion will return to the precise site in the magnetic focus region at which the initial scattering occurred. It can be shown that the maximum radius of curvature will be about 9 centimeters for a 90° scattered, 200 Kev deuterium ion and a little over 11 centimeters for a 200 Kev helium$^3$ ion when the scattering happens in a 10,000 gauss magnetic field.

The general case scattering angle will be less than 90°. Scattered ions normally will then have two components of velocity, one parallel to the magnetic field and the second perpendicular to the field at a radius of curvature less than the 90° case. The general case trajectory of an ion experiencing a near miss at the site of the magnetic focus region will, therefore, be a helix of diameter, D, less than $2\times 11$ or 22 centimeters and having an axial velocity bringing it to one or the other of the accelerating rings of the potential well generator. If the ring diameter is at least 2D (44 centimeters) the ion will pass through and then experience deceleration as it leaves the ring's vicinity. When the electrode has brought the ion's velocity and thus its helix diameter to zero, the ion will then exactly retrace its path through the accelerating electrode and converge with other ions to the spot in the magnetic focus region where the near miss scattering collision had previously occurred. Therefore, even if the ion scattering occurs within the magnetic focus region, the action of the axial magnetic field will always bring the scattered ions back to a convergent point. By continually feeding new ions into the stream, the nuclei density at the magnetic focus/fusion point will continue to increase until fusion reactions are occurring at the same rate as new ions are being introduced and thus, essentially 100% fuel utilization and thus 100% fusion energy production is the result.

One embodiment of the present invention would be for a spacecraft propulsion engine in which a U-shaped configuration of the magnetic containment field solenoid would be used to direct the ions produced from the fusion reaction in essentially the same direction when exiting the two solenoid and thus produce a net thrust to the craft. A second embodiment of the present invention would be for the generation of output power by placing two heat exchangers at the exit ends of the solenoid to intercept the resultant fusion ions and thus convert their kinetic energy to heat. In the latter power generating configuration a straight solenoid could be used as net thrust would not be required to be produced.

In the power generating configuration the two heat exchangers could then be used to produce superheated steam allowing the generation of electrical energy from conventional turbogenerator power generating plants. It can be shown that a modest size, 10,000 pound thrust, spacecraft propulsion unit, when equipped with the necessary heat exchangers for the conversion of the kinetic energy of the fusion particles to heat, would have an output capacity of over 500,000 megawatts $(0.5\times 10^{12}$ watts) in the kinetic energy of its exhaust. This is a prodigious amount of power and can be compared to the total power level of the $15\times 10^{12}$ watts presently used by the world including all forms of fossil fuel combustion in addition to the world's total electrical production. One 10,000 pound thrust engine as described is therefore capable of generating approximately 1/25 the power requirements of the world. Of course, a larger number of smaller capacity units could also be constructed allowing both more manageable size power generating stations and greater flexibility of energy distribution.

Converting some electrical energy produced at the output of the turbogenerators into hydrogen (electrolysis of water to hydrogen can be accomplished at an 83% energy efficiency conversion level), could also be employed as a means of further increasing the ease of energy distribution and use. Hydrogen as a gas could be used as a direct replacement for all present low pressure burning of fossil fuels such as space heating and gas-/oil/coal driven electrical power generating plants. By this means roughly 75% of the present world's $CO_2$ production and thus the Greenhouse Effect would be eliminated.

The remaining 25% of the present world's $CO_2$ production is caused by the use of internal combustion engines required primarily for transportation. Electrical energy produced from the fusion engine could first be converted to hydrogen, and the hydrogen could then be combined with carbon monoxide in a catalytic convertor to result in methanol. Methanol is a liquid at room temperatures and can thus become the direct replacement for gasoline while allowing the use of existing internal combustion engines with only minor fuel mixture modification.

DESCRIPTION OF THE INVENTION

Figure 3:
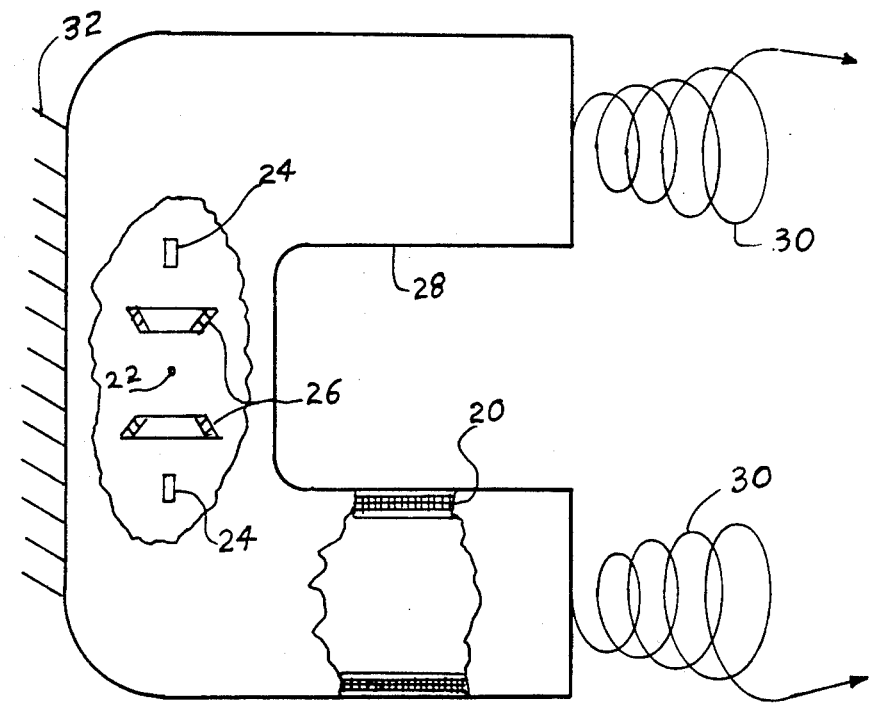

FIG. 3 provides a second embodiment of the present invention as used for the generating of propulsion thrust to accelerate a spacecraft. Two typical, ionized fusion product flight paths are shown leaving the solenoid's magnetic field and thereby generating propulsion thrust to the craft.

Figure 1:
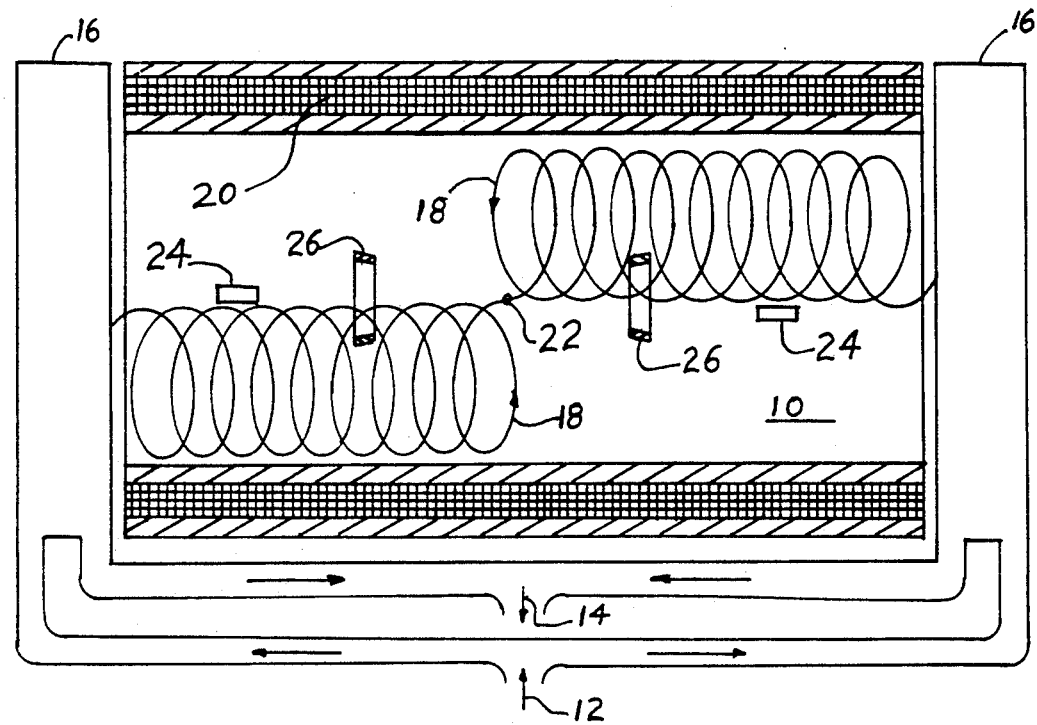
FIG. 1 illustrates one embodiment of the present invention as would be used to generate electrical power by the use of appropriately placed heat exchangers at the two ends of the magnetic containment solenoid. Two typical, ionized fusion product flight paths are shown from their point of origin to impacting the heat exchangers.
Figure 2:
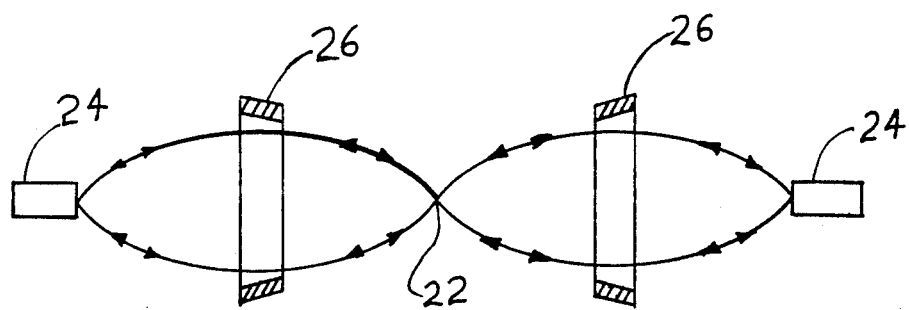
FIG. 2 shows the trajectory envelope of input ions of FIG. 1 as they are accelerated by two ring electrodes to high energies and then magnetically brought to a focus withing a drift region as created between the electrodes by the solenoid magnetic field.
Figure 4:
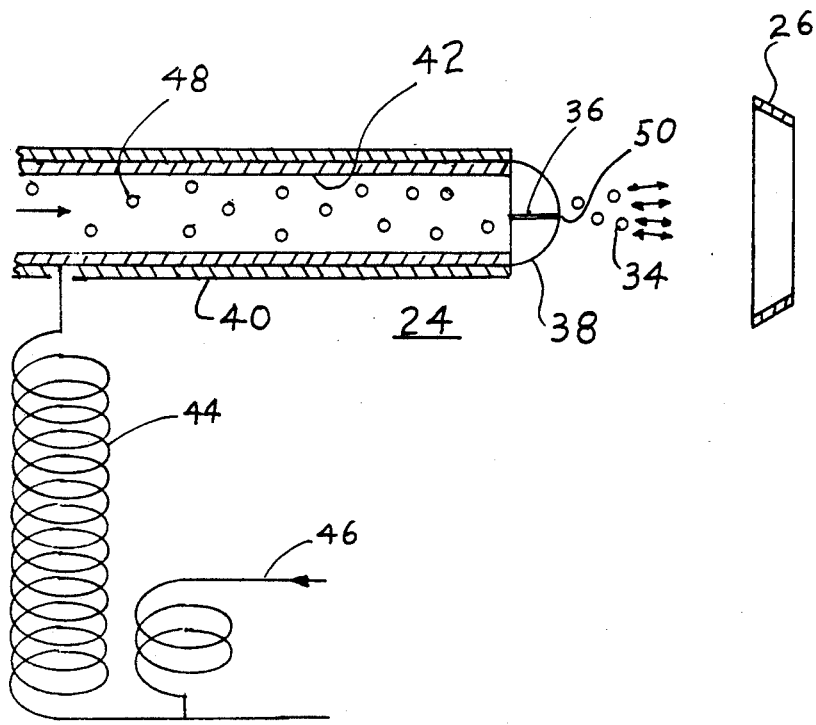

FIG. 4 shows an ionization unit for the present invention that could be used to provide a highly concentrated source of ions for the embodiments of FIGS. 1 and 2.

Figure 5:
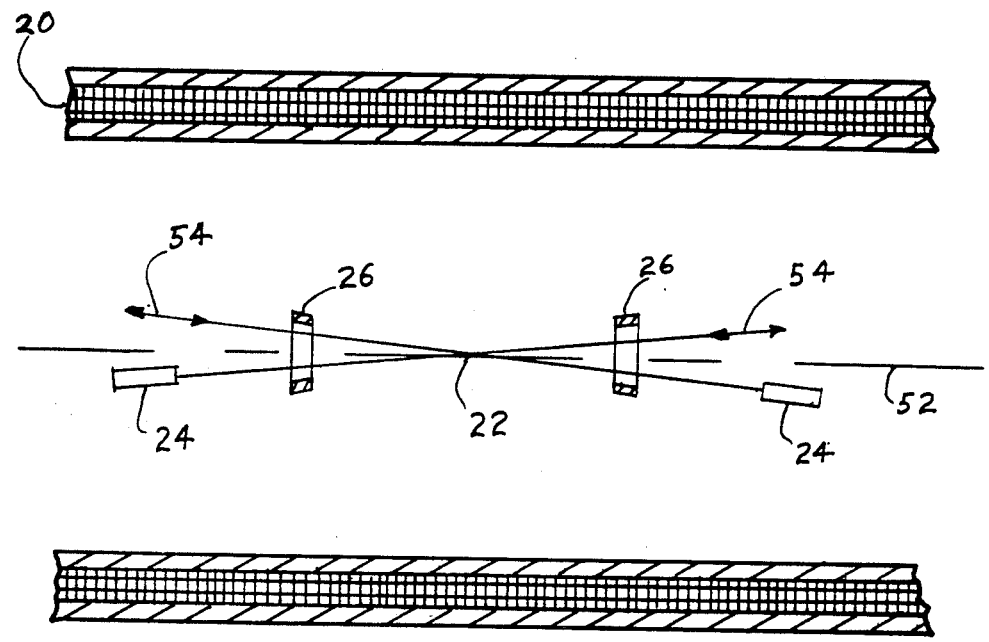

FIG. 5 illustrates the manner by which the two ion sources of FIGS. 1 and 2 can be offset slightly from the major axis of the solenoid to allow the use of different mass input ions. By this means the different oscillating paths, as caused by the use of two different ion masses, will be prevented from colliding with the ion source structures while allowing the magnetic focus points of the two sources to be coincident.

DETAILED DESCRIPTION OF THE INVENTION

As shown in FIG. 1, the heat producing portion 10 of a fusion power plant is in the process of converting coolant liquid 12 to superheated steam 14 by action of the two heat exchangers 16. The heat input to the exchangers 16 is supplied by the kinetic energy of colliding fusion ions 18 as they are intercepted by the heat exchangers. The trajectory of the fusion ions 18 are shown as helixes caused by the interaction of the charge on the ions and the axial magnetic field as created by an electrical current through the conduction wires of the solenoid 20 shown in cross section.

In addition, as shown in FIG. 1, the fusion ions 18 are shown to be emanating from a mid region 22 of the space within solenoid 20. The fusion reaction happening at 22 is caused by collisions of suitable ion pairs as initially injected into the mid region space by ion sources 24. Suitable non-ionized gas is caused by ion sources 24 to become ionized and with the created input positive ions then accelerated to high velocities and thus high energies by action of the negative potential accelerating rings 26. As a result of the electric charge of the ions, their mass, the electrostatic potential of the accelerating rings 26 with respect to the ion source 24 and the axial magnetic field strength as created by solenoid 20, the input ions are caused to converge on and then oscillate through the focus region 22 until fusion reactions are finally created by head on collisions between ions at a rate essentially equal to the input rate that new ion pairs are being added by sources 24.

FIG. 2 provides a symbolic representation of the ion sources 24 and the accelerating rings 26 in addition to the ion trajectory envelope caused by the magnetic field created by solenoid 20 of FIG. 1. As shown in FIG. 2, input ions are caused to pass through a magnetic focal region 22 resulting from the action of the magnetic field from solenoid 20. As the ions at the focal region 22 possess high kinetic energy as determined by the accelerating ring potential with respect to the ion sources, and, on the average, are of equal probability in terms of direction, ion pairs will eventually collide with fusion as the result. Ions experiencing near collisions, as would normally produce scattering of the colliding pairs, are returned to the collision sites after one half an oscillation by the action of the encompassing magnetic field from solenoid 20.

FIG. 3 illustrates a second embodiment of the present invention that is designed to be used as a propulsion engine for a spacecraft. In this embodiment the magnetic field containment solenoid 20 is formed into a U-shaped configuration 28 allowing fusion particles 30 to escape from the magnetic field of the solenoid in a region where the magnetic containment field created by solenoid 20 is becoming progressively weaker with distance from the solenoid ends. As the escaping particles are leaving the solenoid 20 in essentially the same direction, a net resultant reaction thrust is directed against the solenoid magnetic field and thus against structure 32 supporting the solenoid 20. As with the configuration of FIG. 1, a fusion reaction is created at the mid region of the solenoid 20 by action of ion sources 24 and accelerating rings 26 creating a fusion region 22. This configuration of the present invention would be suited for generating propulsion thrust at very high specific impulse (the ratio of thrust to rate of fuel usage) for a spacecraft.

FIG. 4 shows one embodiment of an ion source 24 for the present invention with the purpose of creating a highly concentrated source of positively charged ions 34 as they are formed upon leaving a very small diameter hole 36 as contained in a button of refractory material 38. Ion source 24 consists of an electrically insulative sleeve 40 surrounding an electrically conductive tube 42 that acts as a mounting base for the refractory button 38. As shown, the tube 42 is connected to the secondary of a transformer 44 that by action of a low voltage RF source at the transformer primary 46 causes a high voltage RF excitation to be supplied to tube 42 and thus creates a high intensity electric field to surround the refractory button 38. As unionized gas molecules 48 pass through the small orifice hole 36 contained within the refractory material 38, some ionization of the molecules will occur at the exit point 50. The action of the high intensity RF field in this region will result in the refractory material being bombarded by the ions present causing it to be heated to incandescent temperatures and thus aid in the ionization process by preheating the molecules 48 to ionization temperatures while still within orifice 36. The combination of molecular preheating, ion bombardment as the molecules 48 leave the orifice 36 at exit point 50 and the high intensity electric field at this point causes virtually 100% ionization of the molecules within a very small region of space as defined by the size of the orifice 36. Having a concentrated source of ionization allows a magnetic refocusing at region 22 that will also possess high ion density and thus is conductive for fusion reactions to occur.

Positive ions 34 are accelerated by the negative potential ring 26. As free electrons are also created at region 50 during the ionization process, some "beam riding" electrons will be carried along with the accelerating ions 34 that will act as electrostatic shields between the ions and thus prevent them from spreading by the mutual repulsive forces acting between nuclei.

FIG. 5 shows a second embodiment of the ion sources 24 and the accelerating ring arrangement 26 that allows the use of input ion species having different mass. By offsetting the position of the ion sources 24 from the center line axis 52 of the containment solenoid 20, ions of two different mass numbers (i.e., deuterium and tritium or deuterium and helium$^3$) can be permitted to converge at the same point 22 while allowing different overall path lengths 54 as determined by the different mass numbers of the nuclei. Offsetting the ion sources 24 allows two mass number input ions to oscillate freely in space through focal region 22 without experiencing collisions with one of the other of ion sources 24. This is an important feature as the most desirable fusion reactions that either require the least amount of input energy or do not produce undesirable neutrons as a fusion product (i.e., deuterium and tritium or deuterium and helium$^3$) have different mass numbers for the input ions.

I claim:

1. A fusion power generating system to allow the fusion of low mass number isotopes of hydrogen and helium in a suitable vacuum for generating useful power, comprising ion sources arranged with respect to accelerating electrodes to allow non-ionized gas molecules to be ionized into electron and positive ion components by said sources, said ion components to be accelerated by said electrodes to high velocities before reaching a potential well formed between said electrodes; and an axial magnetic field produced by an electric current through a straight tubular shaped solenoid encompassing said ion sources and said electrodes, said solenoid containing structure to cause the various accelerated ion trajectories to both pass through an opening in said accelerating electrodes and then to converge at a single site within said potential well with resulting fusion collisions; and said axial magnetic field being of a strength to prevent fusion products, created by nuclei collisions at said single site, from reaching said solenoid structure but instead directing the fusion products to the two solenoid ends; and heat exchangers blocking said solenoid ends for intercepting said fusion products and thus allowing the kinetic energy of the products to be converted to heating said heat exchangers; and coolant liquid circulating through said heat exchangers for allowing a heating of the liquid for transferring the kinetic energy of said fusion products to an external generating means for converting the heat to electrical energy.

2. The improvement according to claim 1 comprising a plurality of said ion sources that are positioned to avoid the major axis of said solenoid and thereby allowing said input ion having different mass numbers to serve as inputs sources for the said fusion collisions while avoiding input ion encounters with the sources.

3. The improvement according to claim 1 comprising ion sources that use a refractory material heated by both ion and electron bombardment as caused by a high intensity, high frequency, electric field in the vicinity of said material in the presence of some ionization.

4. The improvement according to claim 1 comprising ion sources that use a refractory material heated by both ion and electron bombardment and with the refractory material containing one or more holes for the purpose of high temperature heating of gas molecules that pass through the holes.

5. The improvement according to claim 1 comprising ion sources in which un-ionized gas molecules are first preheated to high temperatures by passing through one or more holes in a refractory material that has been heated to high temperatures by both ion and electron bombardment and then subjected to the same ion/electron bombardment in conjunction with a high intensity, high frequency electrostatic field to cause the gas molecules to become almost totally ionized.

6. The improvement according to claim 1 comprising ion sources, each source consisting of an insulative sleeve surrounding an electrically conductive tube for the purpose of transporting un-ionized gas molecules to a refractory element containing one or more holes through the element that has been heated to high temperatures by both ion and electron bombardment, wherein un-ionized gas molecules are first preheated to high temperatures by passing through the holes in the refractory element and then subjected to ion/electron bombardment in conjunction with a high intensity, high frequency electrostatic field to cause the gas molecules to become almost totally ionized.

7. The improvement according to claim 1 comprising a solenoid in which the electrical conductive wires of said solenoid are superconductive in order to minimize the amount of input power required to maintain the magnetic field generated by the solenoid.

* * * * *